Dec. 7, 1943.           G. N. HEIN           2,336,250
DOUBLE SEAL PACKING GLAND
Filed Oct. 1, 1940
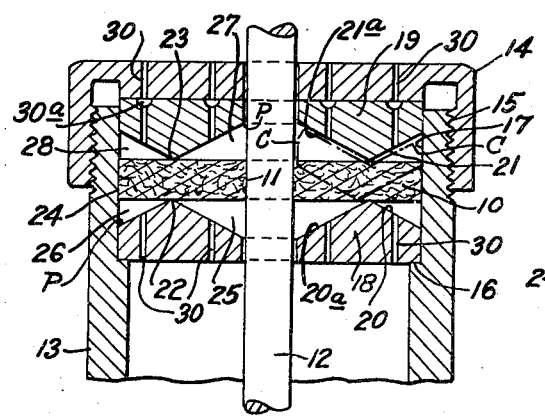
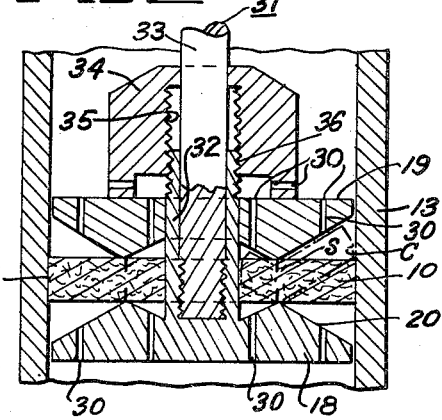
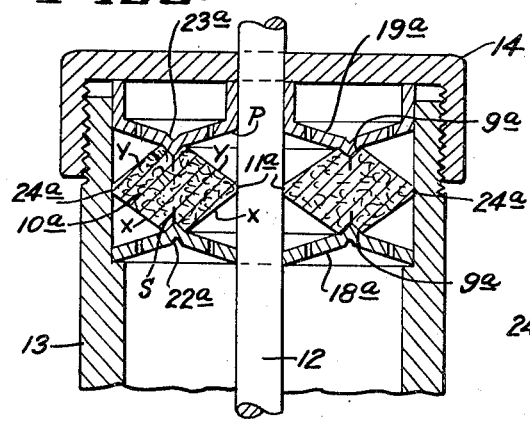
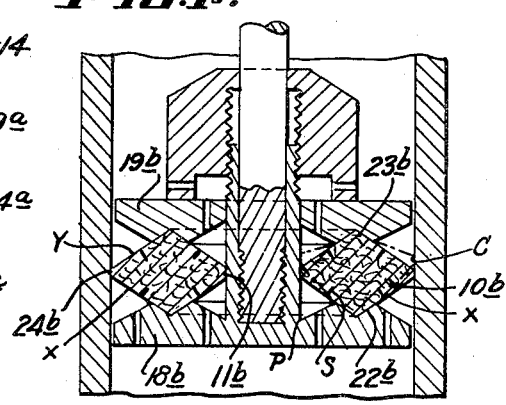
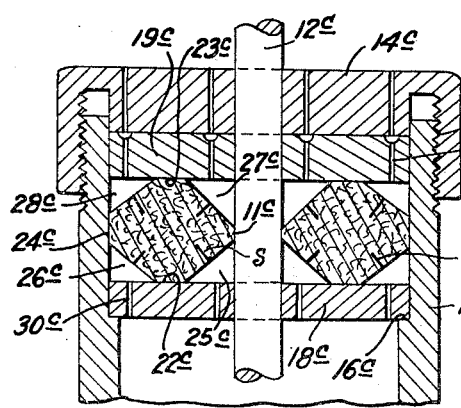
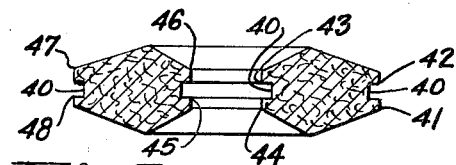
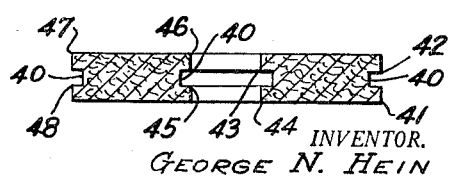
INVENTOR.
GEORGE N. HEIN
BY
ATTORNEY.

Patented Dec. 7, 1943

2,336,250

UNITED STATES PATENT OFFICE 2,336,250

DOUBLE SEAL PACKING GLAND

George N. Hein, San Carlos, Calif.

Application October 1, 1940, Serial No. 359,207

1 Claim. (Cl. 286—26)

This invention relates to packing glands, and particularly to a type of packing gland in which a sealing gasket is provided, and which is impinged intermediate the circumferential and inner edges of its radially inner and outer sealing walls.

Among the objects of the invention are to provide a packing gland which has very great holding power against pressure or suction with a minimum of frictional resistance against any relatively movable or stationary contacting parts. Another object is to provide a packing gland having a flexibly mounted gasket member provided with a radially outward and radially inward sealing wall. A further object is to provide a packing gland to seal against leakage of liquids and gases under either positive or suction pressures and capable of simultaneously sealing in one or more directions when applied between reciprocating, revolving or stationary parts. A further object is to produce a gasket holding means wherein the gasket may be securely held medially of its radial axis providing a peripheral and central sealing wall or lip and leaving both lips free to axially move within a gasket chamber formed by two holding members. A still further object is to provide a combination of a gasket and adjustable gasket holding means wherein the gasket may be free to float between the holding means, but may be thrust by pressure against the face of a holding means medially of the radial body of the gasket, or may be expanded radially by the adjustment means to increase the peripheral diameter or decrease the central bore of the gasket.

With the foregoing and other objects in view, all of which will be more apparent as this description proceeds, the invention is exemplified in one form in the novel construction and combination of parts hereinafter described, illustrated in the accompanying drawing, and pointed out in the claim hereto appended, it being understood that various changes in the form, proportion size and details of construction of the apparatus may be resorted to within the scope of the appended claim without departing from the spirit or sacrificing any of the advantages of the invention.

To more clearly comprehend the invention, reference is directed to the accompanying drawing wherein:

Fig. 1 is an axial transverse section of a throat form of the invention, partly broken away and partly in section.

Fig. 2 is an axial transverse section of a piston form of the invention partly broken away and partly in section.

Fig. 3 is a modification of a throat form of the invention, partly broken away and partly in section.

Fig. 4 is an axial transverse section of a modification of a piston form of the invention, partly broken away and partly in section.

Fig. 5 is an axial transverse section of another modified form of the invention, partly broken away and partly in section.

Fig. 6 is an axial transverse section of a modified form of gasket member.

Fig. 7 is an axial transverse section of another modified form of gasket member.

Fig. 1 is an embodiment of a throat type of packing assembly, consisting of a circular disc-like gasket 10 of flexible material preferably of rubber or synthetic rubber composition, relatively thin axially, as compared with its diameter, and of substantially the same thickness with faces parallel throughout its diameter, and provided with a central bore 11 for reception therethrough of a reciprocal shaft 12. The gasket is preferably a solid body; that is, it is impervious to passage of fluid therethrough. The gasket is housed in a cylinder 13 having a head closure member 14 threadably connected to the cylinder body at 15. The cylinder 13 is reamed out to an increased inner diameter at its end portion providing a shoulder 16 and an axial recessed chamber generally indicated 17 between said shoulder and the inner face of cylinder head 14. Within this recessed chamber 17 are gasket supporting members or blocks which obviously have substantial rigidity as compared to the gasket material to resist deformation by pressure of the gasket thereagainst, the lower block 18 being supported on the shoulder 16 and the upper outer block 19 being in contact with and movable by the cylinder head 14. Though it is obvious that if desired the block member 19 could be made integral with the cylinder head, it is much preferred that it be separate therefrom for purposes of relative turning of the contacting faces of cylinder head and abutting block for purposes of adjustment hereafter mentioned. In the throat form of Fig. 1, the cylinder head 14 and blocks 18, 19 have centrally disposed openings therethrough for receiving the reciprocal shaft 12, in substantial axial alignment with the opening 11 of gasket 10. The inner opposing faces 20 and 21 of the respective block members 18, 19 are each tapered from their respective circumferential and central edges to an intermediate apex in section, providing opposed annular ridges 22, 23 between which the gasket 10 is disposed and against which it is impinged intermediate its radially inner and circumferentially outer sealing edges or walls 11 and 24. These walls 11, 24 are referred to as sealing edges to distinguish them from other walls and faces. Such construction permits each sealing edge or wall 11, 24 of the gasket 10 to flex into the annular cavities 25, 26, 27, 28 which are triangular in section, the base of the triangle being the face of the gasket, its height being the wall of the cylinder or the central shaft, as the case may be, and the apices (indicated P), of the triangles being at the junction of the height-wall and the hypothenuse, thus effecting sealing at both said sealing edges or wall 11, 24 against the immediately adjacent walls of the respective shaft and cylinder. It is preferred, especially in washers of the smaller diameters, that the apices of ridges 22, 23, shall impinge upon the gasket 10 in greater spaced relation from one sealing edge of the gasket than from the other, the greater distance being from the surface of the moving member with relation to which the seal is made; that is, in Fig. 1, the shaft 12, and in Fig. 2, the cylinder 13. Thus, in Fig. 1, the greater diametral distance of flexible lip of the gasket would be that portion thereof which lies between the wall portions 20ª and 21ª of the members 18, 19, since the shaft is the relatively movable member, whereas in Fig. 2, hereafter described, a piston is the member movable relative to cylinder 13. This construction provides a quicker sealing action of the gasket at its longer lip and less friction against the member with relation to which the gasket has relative movement, whether it be the shaft of Fig. 1 or the cylinder of Fig. 2.

Since the gasket is held by impingement intermediate its radially inner and outer sealing edges, and inasmuch as the gasket is adapted for flexing under pressure at its sealing edges responsive to pressure of fluid in the cylinder, coupled with the purpose of avoiding friction in sealing faces of relatively large areas, it may be stated that the total axial width of the sealing edges between the supporting plate members, with relation to the transverse width or diameter of the gasket, it is preferably less than half of such transverse width measured between the radially outer and radially inner sealing edges, thus eliminating large frictional areas and yet providing for a substantial portion of the gasket body on each side of the point of medial impingement and providing a relatively thin total area of sealing edge, the gasket supporting means being spaced from such sealing edge so as to permit flexibility of the sealing edges of the gasket.

It will be noted that the block members 18, 19 are axially adjustable by means of the threaded mounting of cylinder head 14, whereby pressure of the ridges of the blocks on the flexible gasket may be increased or decreased to adjust the radial dimension of the gasket to a loose or tight fit against the walls at its sealing faces. This is also important in case of wear of the sealing faces of the gasket. The gasket 10, being supported by the ridges 22, 23 and being of flexible characteristics, it is obvious that the adjustment of the apices toward each other increases the impingement of apices of the ridges 22, 23 on the gasket, medially thereof, and if the adjustment is toward the gasket it crowds the material thereof so that the gasket is spread radially at its sealing faces or edges 11, 24 into a tighter contact with the inner wall of cylinder 13 and the outer surface of shaft 12; and that loosening the adjustment of the apices of the ridges 22, 23 in the opposite direction, that is, away from each other, releases the frictional grip of said sealing faces 11 and 24. Thus, the packing gland may be very accurately adjusted to any condition in which it is employed, and any wear on the sealing faces may also be compensated.

The members 18 and 19 do not have extremely close or tight frictional engagement with the respective cylinder wall and shaft with relation to which they move; therefore, under pressure the fluid or gas within the cylinder may exert its pressure in cavities 25, 26, 27 and 28 on the gasket 10 on both sides laterally of the point of impingement of apices 22, 23, thus causing the gasket to operate in a similar manner at both its sealing edges by a double-lipped operation. Since it is desired to obtain instantaneous reaction of the gasket to pressure thereagainst, and since the lower blocks 18, 19 have a reasonably close, though not tight, fit relative to the cylinder wall or shaft, as the case may be, it has been found that efficiency is increased by providing small vents or openings 30 therethrough, and where the openings 30 are also placed in the upper block 19 in the throat type, as in Fig. 1, openings may also be provided in the head of the cylinder, annular grooves 30ª being cut in block 19 so that the openings 30 in the head and block will always communicate.

Referring to Fig. 2, which is an adaptation of the invention to a piston structure, the gasket 10 and members 18, 19 are substantially similar in structure to members correspondingly indicated in Fig. 1, except that the member 18 is also the piston face. The piston rod assembly 31 comprises an extended sleeve portion 32 which may be integral with the piston head block 18, the sleeve having a socket in which the rod or shaft 33 is fixedly secured in any suitable manner. The adjustment of the members 18, 19 relative to each other and relative to the gasket 10 is accomplished by an adjusting nut 34 which straddles the rod 33 and is provided with an internal threaded bore 35 for engaging corresponding threads 36 on the exterior of sleeve 32.

In Fig. 3, the structure, with exception of the gasket, corresponds generally with the above description of Fig. 1, the block members 18ª and 19ª being rigid pressed metal forms and adapted at their apices 22ª and 23ª to engage medially the impervious gasket 10ª in annular gasket grooves 9ª. The gasket 10ª in Fig. 3 is diamond-shape in section and provides sealing edges 11ª and 24ª which have a very narrow bearing upon the walls against which the seal is to be made, but which may be broadened by suitable adjustment of the cylinder head 14 in the same manner as described with relation to adjustment of the pressure on the gasket described in Fig. 1.

In Fig. 4, the structure, other than gasket 10ᵇ, is substantially similar to the structure in the piston form of Fig. 2, the rigid block members 18ᵇ and 19ᵇ having annular indentations 22ᵇ and 23ᵇ at their respective apices to receive and support a ridge portion of a gasket 10ᵇ which latter is diamond shape in cross-section. The sealing faces of the gasket 10ᵇ are adjustable by the same type of mechanism described in Fig. 2 with the same result on the sealing edges 11ᵇ and 24ᵇ as is described with relation to the gasket in Fig. 3.

In Fig. 5 is disclosed a form of throat type packing gland which is a combined modification of the types disclosed in Figs. 1 and 2, and types of Figs. 3 and 4. The cylinder 13c, head 14c, shaft 12c, recess shoulder 16c, and openings 30c in blocks 18c and 19c, may all be similar to corresponding mechanical parts of Fig. 1. The block members 18c and 19c are circular discs, the opposing faces of which are relatively parallel. The gasket member 10c is heptagon in section, and at its sealing wall which cooperates with a relatively movable member, which in this case is the radially inner sealing wall 11c against shaft 12c, the gasket has a relatively sharp angle, whereas its radially outer circumferential sealing wall 24c against the non-moving inner face of the cylinder is relatively broad, the gasket being also provided with impingement faces 22c and 23c of substantial width, against which the opposed faces of the blocks 18c and 19c may bear. Upon adjustment of the head 14c by means of threads 15c, the contact walls or points 11c and 24c may be adjusted with relation to the surface against which it bears. The narrow sealing edge or wall 11c which abuts a moving part, shaft 11c, is much more susceptible to wear and is also much more sensitive to adjustment than the broader sealing face 24c. It will be noted that the triangular area of annular cavities 25c, 26c, 27c and 28c are also preserved in this modified form, by tapering the faces of the gasket from the impinged faces 22c, 23c to the sealing edges 11c and 24c.

As in Fig. 1, so in Figs. 2 to 5 inclusive, the total axial width of the sealing walls or edges of the gaskets (11, 24, and sub-letters), are all of less total axial width between the supporting members than one half the radial transverse dimension between outer and inner sealing edges.

In the modified forms of gaskets shown in Figs. 6 and 7, a plurality of sealing edges are provided by grooving the sealing wall of the gasket as at 40. Such a groove may be provided in any of the types of gaskets employed, where the sealing face is sufficiently wide to accommodate such a groove.

In all of the figures and modifications disclosed and described herein, it is to be understood that the gasket is a flexible material, such as rubber or a combination material which is flexible, and preferably with a reasonable degree of resiliency. In the employment of relative harder materials for the gasket, it has been found that the efficiency of the gasket, both in sealing capacity, immediate response to pressure, and in fineness of adjustment, is materially increased by knife-like slits in the gasket, as indicated S in Figs. 2 to 5, inclusive.

The efficiency of the packing gland depends on the factors of minimum frictional resistance combined with maximum sealing capacity. In its normal position, which is the position shown in full lines in the several views, the gasket has very light frictional pressure against the walls which abut the sealing wall or edge of the gasket. While a light frictional pressure is a relative term, it is intended to differentiate from the frictional pressure of gaskets which depend for their sealing capacity on a tight frictional contact. This differentiation may be better illustrated by an example: in actual tests of the structures of the several illustrated exemplifications, the normal frictional resistance is about one pound, yet the gaskets have consistently held tight under pressures up to one thousand pounds per square inch and higher. In Figs. 1 and 2, when pressure is exerted upon the gasket, the radially outer and radially inner portions are tipped or flexed on the apices of the annular ridges of the block members 18, 19, as shown in dotted lines in Figs. 1 and 2 which shortens the radius from such ridge on concave face of the gasket and increases the radius on the opposite or convex face. This action crowds the material of the gasket into the annular triangular cavities 25 to 28, dependent on the direction of pressure against the gasket. Since the gasket is backed-up adjacent the ridge by the face of the block 18 or 19, the crowding of the elastic or flexible gasket material into the triangular cavity causes it to be compressed toward the progressively narrowing angle of the apex P, thus crowding that portion indicated C into close sealing contact with the wall against which a seal is to be made. The greater the pressure against the face of the gasket, the greater will be the crowding of material into the triangular cavity and consequently the greater will be the sealing capacity. On the other hand, upon release of the pressure by reversing the stroke of a piston or shaft, the compression on the flexible gasket is released and it immediately becomes freed from its distorted shape, assuming first its normal shape and position with the normal minimum of friction against the adjacent relatively moving element, whether cylinder wall or shaft, and is again ready to be flexed in the same manner or in the opposite direction.

In the gaskets shown in Figs. 3 and 4, the sealing edges of the gasket (11a and 24a in Fig. 3 and 11b and 24b in Fig. 4), provide a very narrow contact with the abutting surfaces, but this contact may be widened in case of wear or for high pressures by adjustment of the respective blocks 19a and 19b to compress the gasket medially and thereby crowd its body material radially inwardly and outwardly. In usual operation the types of gasket, illustrated in Figs. 3 and 4, will automatically have their contacting sealing edges widened, when under pressure, by crowding of its body material radially due to the equalized pressures on the diagonal faces X of the gasket when the pressure is in one direction and faces Y when the pressure is from the opposite direction. In some respects this very narrow contacting sealing edge of the gasket has an additional advantage as compared with the broader sealing edge 11, 24 of Figs. 1 and 2, in that upon reversal of stroke there is only a very slight degree of flexing action and the tipping of the sealing edge in the opposite direction upon reversal of stroke is somewhat smoother.

In Fig. 5 the two types of sealing edges are combined in a single gasket, to meet conditions where it is desirable to provide a more sensitive degree of adjustability and sealing capacity at one sealing edge than at the other sealing edge. In adapting the gasket of Fig. 5 to a piston type of packing, the narrow sealing edge would abut the cylinder wall and the wider sealing edge would abut the piston hub.

In the gaskets of Figs. 6 and 7, a plurality of sealing edges of the gaskets are provided by the grooves 40, the flexing of the gasket being actuated in the same manner as the other gaskets described. However, under pressure from one direction, the flexing of the gasket from its normal plane upon a fulcrum intermediate its inner and outer sealing edges, provides a plurality of sealing edges indicated 41, 42, 43, 44 and when the pressure is from the opposite direction, it is obvious that the same sealing effect would be produced at the corresponding opposite gasket edges 45, 46, 47, 48.

It will be noted that all of the figures, 1 to 5, inclusive, have the characteristic in common that the gasket is medially impinged and has a flexible portion or lip on each lateral side of the point of impingement, that each gasket has a radially inner and a radially outer sealing wall or edge, that each structure provides on each planar face of the gasket and on each lateral side of the point of impingement thereof, a triangular cavity between the supporting blocks and the gasket, and adjustment means for regulating the impingement of the blocks on the gasket.

The gaskets of Figs. 3 and 4 have been described as generally diamond-shaped in section which description is as a generic term meaning any geometric figure in which the gasket has a planar face disposed at less than 90° to the axis of the point of impingement.

While the application of a gasket of this type may find its most usual employment in a piston or throat wherein one element is reciprocable relative to another, it is to be understood that the invention is not limited to use with relatively reciprocable parts, but may be employed with equal efficiency where the parts do not have relative reciprocation, but have relative rotation, such as a packing gland for a rotating shaft.

Having thus described my invention, I claim:

In a packing for cylinders having therein a member movable axially longitudinally relative to said cylinder, a flexible gasket member impervious to passage of fluid therethrough disposed transversely to the axis of the cylinder and having radially inner and radially outer sealing edges of flexible body material for contact, respectively, with the inner wall of the cylinder and the wall of the said relatively movable member, and a substantially rigid gasket supporting means in the cylinder having relatively opposed faces adapted for engaging the gasket at both opposite gasket faces intermediate its radially inner and radially outer sealing edges, the supporting means and the sealing edges of the gasket being in axially spaced relation, providing an annular cavity to permit flexure of the sealing edges of the gasket responsive to pressure thereagainst by fluid in the cylinder, and the total axial width of the sealing edges of the gasket between opposed faces of the supporting means being less than half the radial transverse width of the gasket between its radially inner and radially outer sealing edges, and in which the gasket member has its transverse faces convergingly inclined relative to its axis between the point of engagement by the supporting means and the sealing edge of the gasket.

GEORGE N. HEIN.